(12) United States Patent
Brossard

(10) Patent No.: US 9,212,882 B2
(45) Date of Patent: Dec. 15, 2015

(54) HIGH PRECISION MEASURING TAPE

(71) Applicant: Pierre Brossard, Frenchville, PA (US)

(72) Inventor: Pierre Brossard, Frenchville, PA (US)

( * ) Notice: Subject to any disclaimer, the term of this patent is extended or adjusted under 35 U.S.C. 154(b) by 85 days.

(21) Appl. No.: 14/219,589

(22) Filed: Mar. 19, 2014

(65) Prior Publication Data

US 2015/0268024 A1 Sep. 24, 2015

(51) Int. Cl.
   *G01B 3/10* (2006.01)
(52) U.S. Cl.
   CPC ............ *G01B 3/1082* (2013.01); *G01B 3/1056* (2013.01)
(58) Field of Classification Search
   CPC ............................ G01B 3/1082; G01B 3/1056
   USPC ............................................ 33/755, 760, 762
   See application file for complete search history.

(56) References Cited

U.S. PATENT DOCUMENTS

| | | | | |
|---|---|---|---|---|
| 3,289,305 A | * | 12/1966 | Claud Norton | 33/759 |
| 4,965,944 A | * | 10/1990 | Kuze et al. | 33/760 |
| 5,433,014 A | * | 7/1995 | Falk et al. | 33/760 |
| 5,746,001 A | * | 5/1998 | Fisher | 33/679.1 |
| 6,237,243 B1 | * | 5/2001 | Cook | 33/770 |
| 6,338,204 B1 | * | 1/2002 | Howle | 33/755 |
| 7,228,644 B1 | * | 6/2007 | Hellem et al. | 33/760 |
| 7,431,212 B2 | * | 10/2008 | Kaner | 33/755 |

* cited by examiner

*Primary Examiner* — G. Bradley Bennett
(74) *Attorney, Agent, or Firm* — Duane Morris LLP; J. Rodman Steele, Jr.; Gregory M. Lefkowitz

(57) ABSTRACT

A high-precision measuring device, a kit including the same, and a method of measuring objects using the same are disclosed. The measuring device can include a tape measure that has a retractable measuring tape adapted to extend longitudinally from the tape measure. The retractable measuring tape comprises a plurality of uniformly spaced primary markings. A secondary scale can be coupled to the tape measure, where the secondary scale includes a plurality of uniformly spaced secondary markings. The distance between adjacent secondary markings can be less than a distance between adjacent primary markings. In some instances, the distance between adjacent secondary markings is set to be equal to $9/10^{th}$ of the distance between adjacent primary markings.

20 Claims, 4 Drawing Sheets

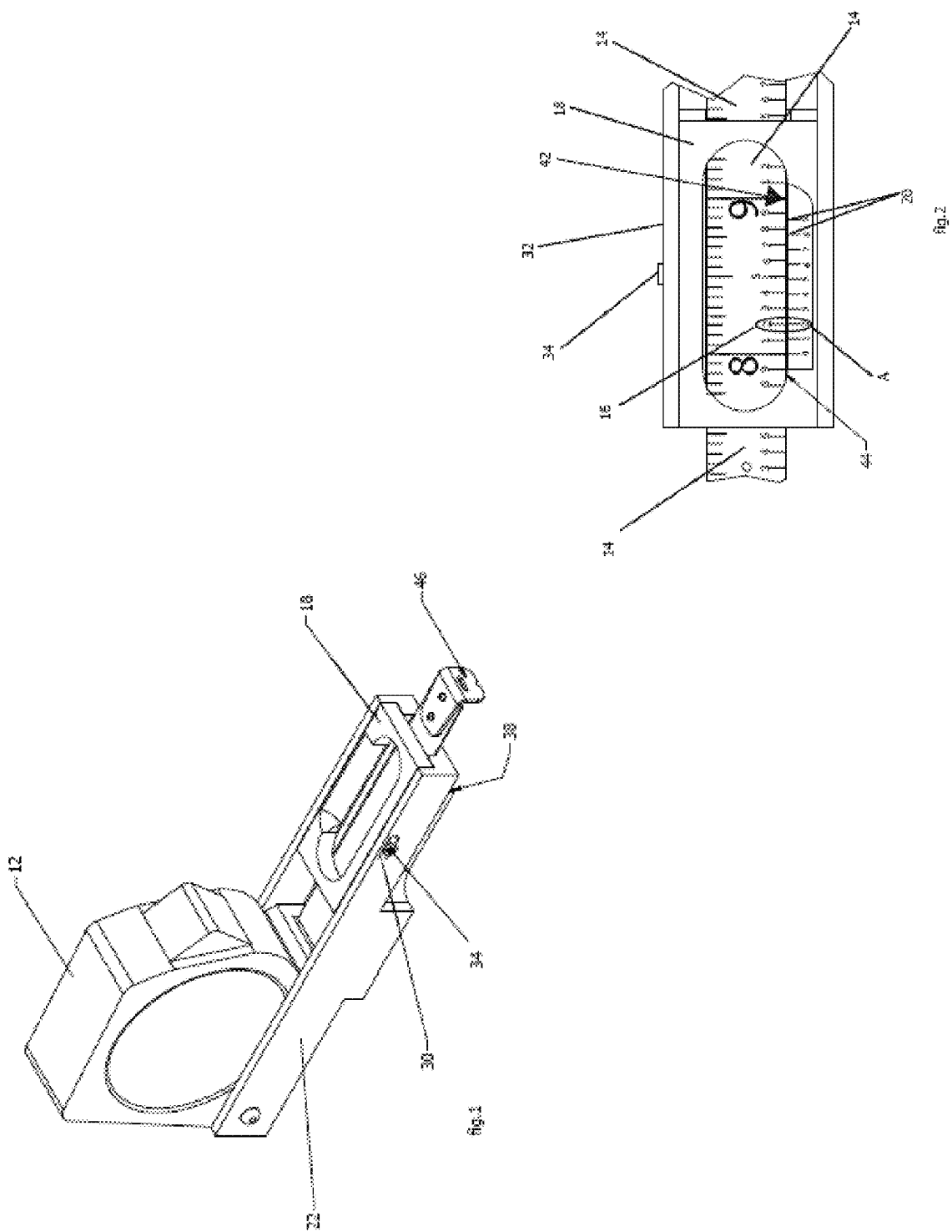

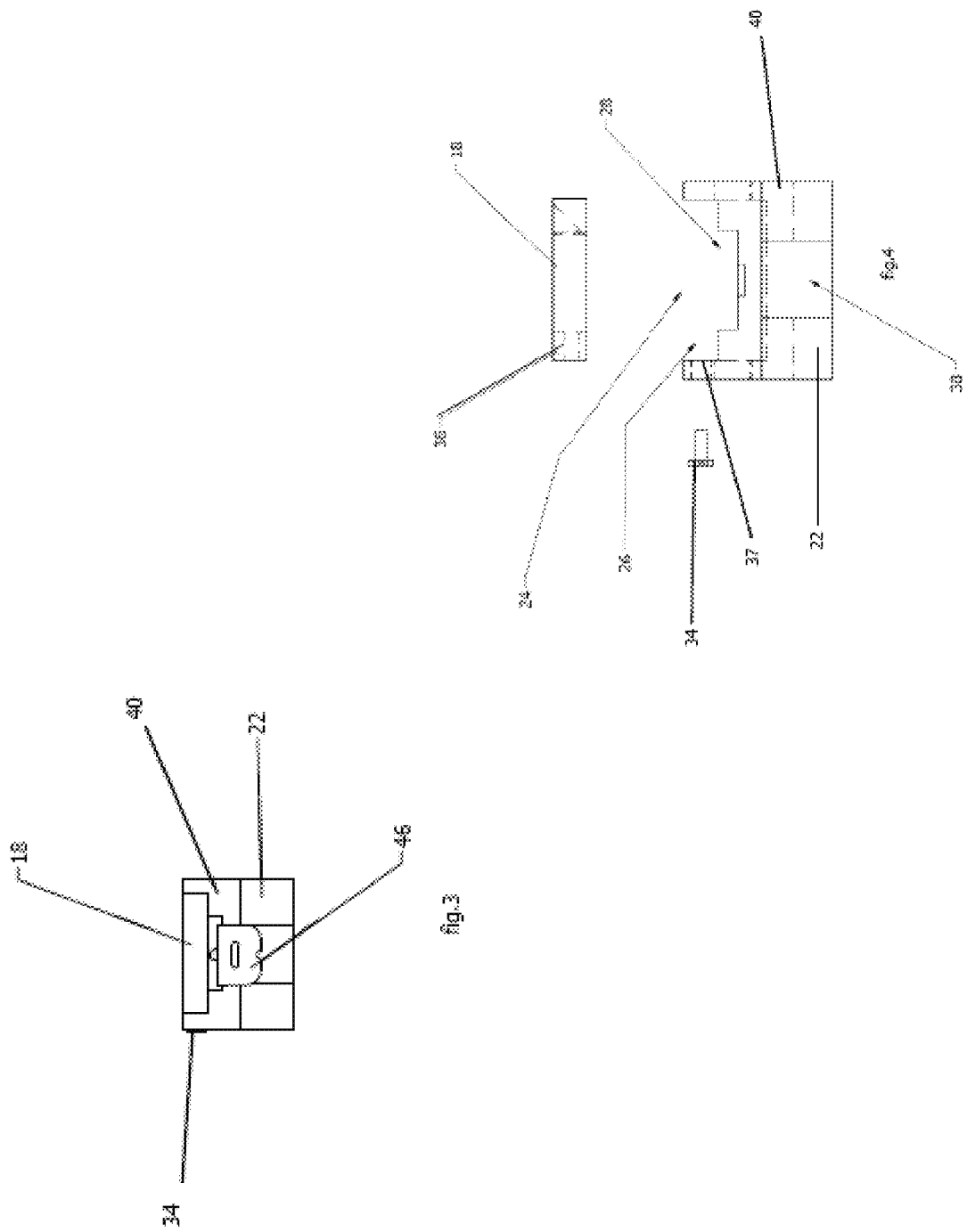

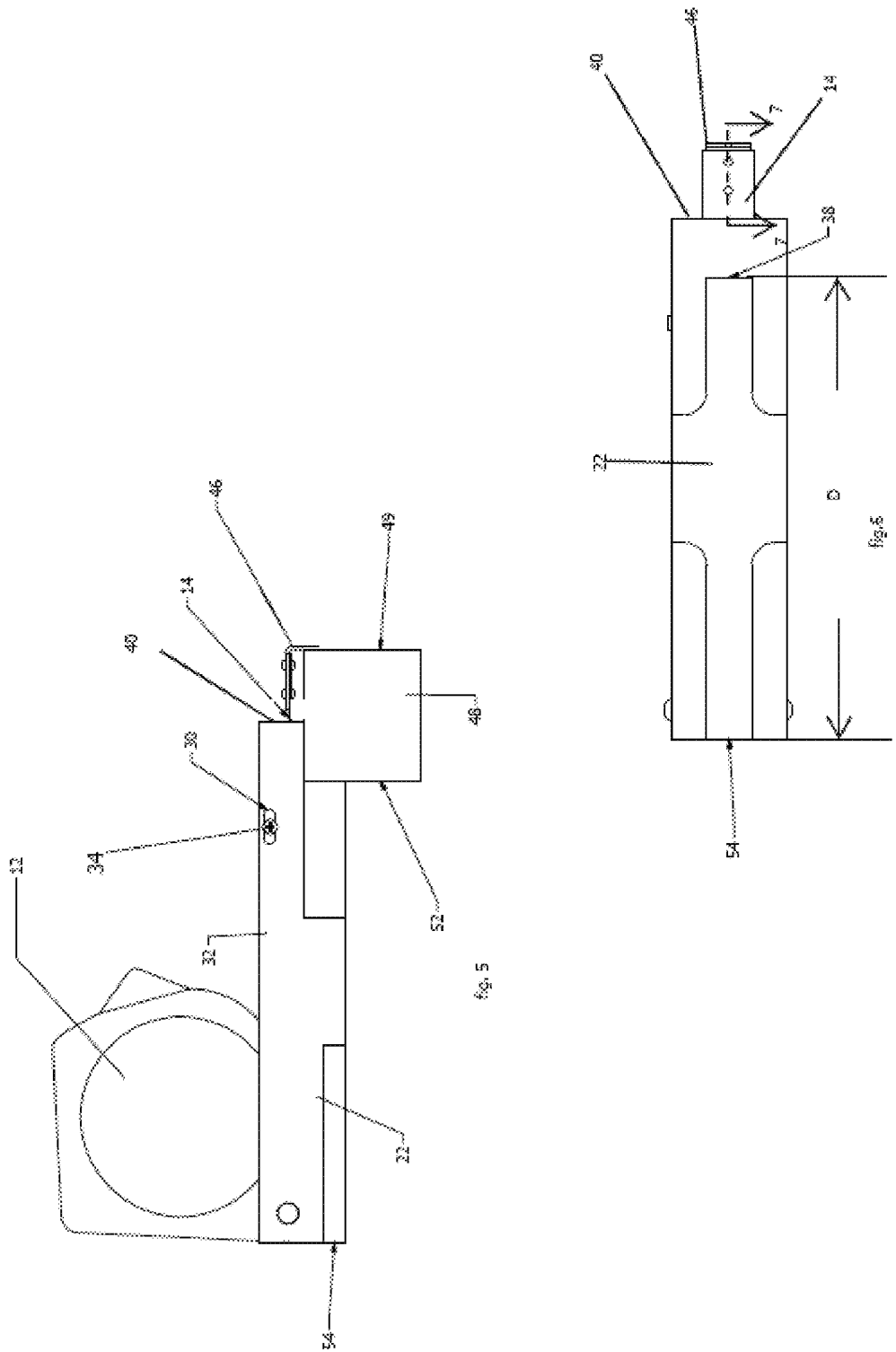

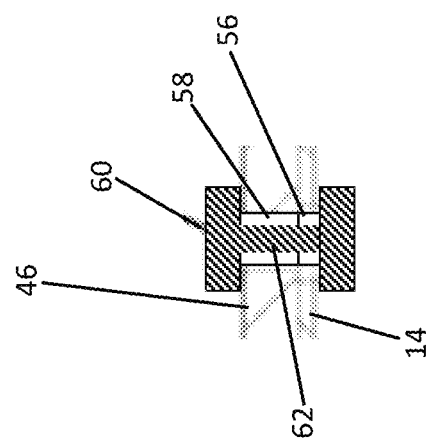
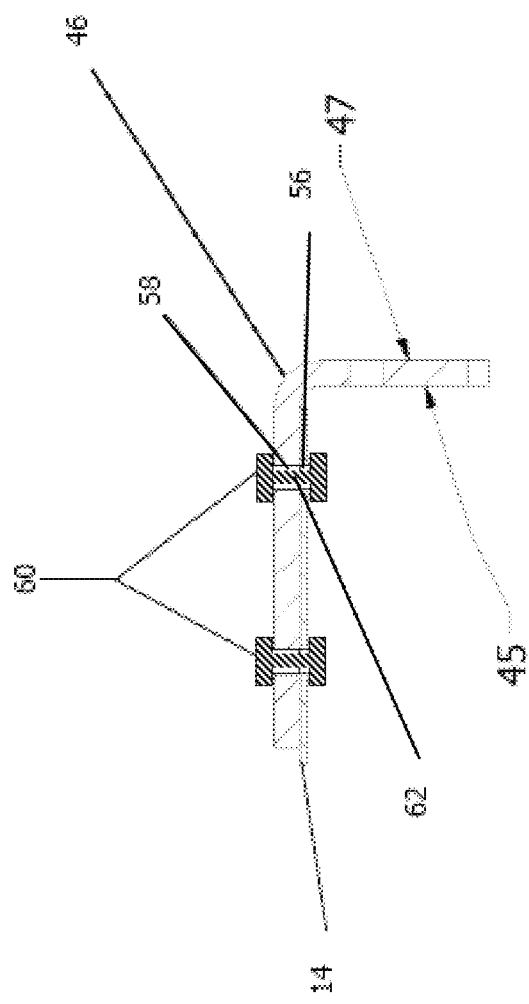

HIGH PRECISION MEASURING TAPE

FIELD OF THE INVENTION

The present invention relates generally to measuring devices, and more particularly to high-precision portable tape measures used for measuring large objects.

BACKGROUND

Techniques for high-precision measurements are known. However, such measurements are usually limited to relatively small objects using delicate measuring devices, such as Vernier calipers. Large objects, such as sheet metal, pipes, and lumber, are frequently measured. However, high precision measurements of such large objects is difficult and often requires use of expensive equipment or devices that are not easily transported.

SUMMARY

In one embodiment, a measuring device is disclosed. The measuring device includes a tape measure comprising a retractable measuring tape adapted to extend longitudinally from the tape measure, where the retractable measuring tape comprises a plurality of uniformly spaced primary markings. A lip can be coupled to a distal end of the measuring tape.

The measuring device also includes a secondary scale coupled to the tape measure, where the secondary scale comprises a plurality of uniformly spaced secondary markings. The distance between adjacent secondary markings is less than a distance between adjacent primary markings, and the secondary scale is positioned for direct comparison of the primary markings with the secondary markings.

The secondary scale can be coupled to the tape measure by a guide comprising a measuring channel comprising an upper channel and a lower channel. The guide can include a longitudinally extending slot passing from a side of the guide to the upper channel, and the measuring device and also include a releasable fastener passing through the slot for slidably coupling and locking the secondary scale in place. The guide can include a measuring notch on an underside of the guide.

In another embodiment, a kit that includes a measuring device as described herein and a calibration block is also disclosed. The kit can also include directions for calibrating the measuring device using the calibration block. The calibration can include (1) placing the calibration block so that the lip presses against a first side of the calibration block and an opposite side of the calibration block presses against a notch of the guide, and (2) adjusting a longitudinal position of the secondary scale.

These and other features, objects and advantages of the present invention will become more apparent to one skilled in the art from the following description and claims when read in light of the accompanying drawings.

BRIEF DESCRIPTION OF THE DRAWINGS

FIG. 1 is a side view of a measuring device as described herein.

FIG. 2 is a top view of the primary and secondary markings used to take measurements using the measuring device described herein.

FIG. 3 is an end view of the distal end of the guide of the measuring device described herein.

FIG. 4 is an exploded view of FIG. 3 without the measuring tape and lip.

FIG. 5 is a side view of the measuring device as described herein showing an object being measured.

FIG. 6 is a bottom view of the measuring device.

FIG. 7 is a cross-sectional view of the measuring tape and lip of FIG. 1 taken along cut line 7-7.

FIG. 8 is a detailed view of a rivot and the relevant orifices from FIG. 7.

DETAILED DESCRIPTION

As shown in FIGS. 1-8, a measuring device 10 for high precision measuring is disclosed. The measuring device 10 can include a tape measure 12 that includes a retractable measuring tape 14 adapted to extend longitudinally from the tape measure 12. The measuring device 10 also includes a lip 46 coupled to a distal end of the measuring tape 14. As best shown in FIG. 2, the retractable measuring tape 14 comprises a plurality of uniformly spaced primary markings 16. A secondary scale 18 is coupled to the tape measure 12, where the secondary scale 18 includes a plurality of uniformly spaced secondary markings 20. The distance between adjacent secondary markings 20 is less than a distance between adjacent primary markings 16.

As shown in FIG. 2, the secondary scale 20 is positioned for direct comparison of the primary markings 16 with the secondary markings 20. In some embodiments, a distance between adjacent secondary markings 20 is set to be equal to $9/10^{th}$ of a distance between adjacent primary markings 16. For example, in some embodiments the distance between adjacent primary markings can be 0.1 inches or 0.1 cm, while the distance between adjacent secondary markings can be 0.09 inches or 0.09 cm.

In such embodiments, the length of an object is determined by placing the measuring notch 38 against a first end of the object and the inner surface 45 of the lip 46 against a second end of the object against, then reading the whole number and first decimal place using the primary markings 16 on the measuring tape 14 and determining the second decimal place based on which of the secondary markings 20 lines up most exactly with a primary marking 16. In FIG. 2, the zero of the secondary markings falls between 2 and 2.1 on the measuring tape 14 while the best alignment (A) of the primary and secondary markings occurs at 2 on the secondary markings. Thus, the tape measure in FIG. 2 reads 2.02 inches.

In some embodiments, the inner dimension on an object (e.g., a pipe) can be measured by placing the rear measuring notch 54 against a first inner surface of the object and an outer surface 47 of the lip 46 against a second inner surface of the object then obtaining a raw measurement as described immediately above. In order to obtain the inner dimension, the distance (D) between the measuring notch 38 and the rear measuring notch 54 must be added to the raw measurement. In embodiments that include instructions, the instructions can include the steps of placing the rear measuring notch 54 and the outer surface 47 against opposing, inner surfaces of the object, obtaining a raw measurement and adding the distance (D) in order to obtain the inner dimension. In some embodiments, the distance (D) can be provided with precision of ±0.01 inches, or ±0.001 inches, or ±0.1 mm, or 0.01 mm.

In some embodiments, the lip 46 can be adjustably coupled to the retractable measuring tape 14. Such an arrangement can be designed to enhance the accuracy of the length and inner dimension measurements described herein.

For example, the lip 46 can be coupled to the measuring tape 14 in a manner that allows the lip 46 to slide longitudinally (x-axis in FIG. 7) an amount equal to the thickness (t) of the lip 46. For example, the measuring tape 14 can include one or more tape orifices 56 and the lip 46 can include one or more lip orifices 58 that align with one another. As shown in FIGS. 7-8, the shaft 62 of one rivot 60 can pass through each of the tape orifice 56-lip orifice 58 pairs. In order to facilitate the controlled sliding, in some embodiments, the diameter of the tape orifice 56 plus the diameter of the lip orifice 58 minus twice the diameter of the rivot shaft 62 can be equal to the thickness (t).

In some embodiments, the secondary scale 18 is coupled to the tape measure 12 by a guide 22 having a measuring channel 24. In some embodiments, the guide 22 and the tape measure 12 are integrally formed.

As best shown in FIG. 4, the measuring channel 24 can have an upper channel 26 and a lower channel 28. In some embodiments, the retractable measuring tape 14 fits slidably within the lower channel 28 and the secondary scale 18 is slidably coupled to the guide 22. The secondary scale 18 can be slidably coupled to the upper channel 26.

In some embodiments, the guide 22 can include a longitudinally extending slot 30 passing from a side 32 of the guide 22 to the upper channel 26. The upper channel 26 can be wider than the lower channel 28.

In such embodiments, the measuring device 10 can also include a releasable fastener 34 passing through the slot 30 for slidably coupling and locking the secondary scale 18 in place. For example, the releasable fastener 34 can be a set screw and the secondary scale 18 can include a threaded orifice 36 (shown in dotted lines in FIG. 3) for receiving the set screw. In other embodiments, the slot 30 can be a threaded opening and the releasable faster 34 can be a screw that is tightened against a longitudinal edge of the secondary scale 18.

In some embodiments, the guide 22 includes a measuring notch 38. As shown in FIG. 5, the measuring notch 38 can be on an underside of the guide 22. The notch can be set back from a distal end 40 of the guide 22. In other embodiments, the measuring notch can be the distal end 40 of the guide 22.

In some embodiments, the guide 22 extends longitudinally from the tape measure 12. In such embodiments, the primary markings 16 can be located along a first longitudinal edge 42 of the measuring tape 14 and the secondary marking can be along an edge 44 of a secondary scale 18 most proximate the first longitudinal edge 42.

The invention is also drawn to a kit that includes any of the measuring devices 10 described herein and at least one calibration block 48. The kit can also include directions for calibrating the measuring device 10 using the calibration block 48.

The instructions for calibrating the measuring device 10 can include placing the calibration block 48 so that the inner surface 45 of the lip 46 presses against a first side 50 of the calibration block 48 and an opposite side 52 of the calibration block 48 presses against the measuring notch 38. The instructions can then include adjusting a longitudinal position of the secondary scale 18 so that the 0 of the secondary scale 18 aligns with the appropriate value on the primary markings 16. For example, if the calibration block 48 is 2 inches long, the secondary scale would be adjusted so that the secondary marking 20 of the secondary scale 18 representing 0 is aligned with the primary marking representing 2.0 inches.

The invention also includes a method of measuring an object. The method can include providing a calibrated measuring device 10 as described herein. If the measuring device 10 has not been calibrated, the measuring device 10 can be calibrated as described with respect to the instructions above.

The method of measuring can also include placing the lip 46 of the measuring tape 14 over a first edge 50 of the object (e.g., calibration block 48) and the notch 38 can be placed against an edge 52 of the object opposite the first edge. The dimension of the object can then be measured by reading the whole number and first decimal place using the primary markings 16 on the measuring tape 14 and determining the second decimal place based on which of the secondary markings 20 lines up most exactly with a primary marking 16.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A measuring device, comprising:
a tape measure comprising a retractable measuring tape adapted to extend longitudinally from a tape measure housing, wherein said retractable measuring tape comprises a plurality of uniformly spaced primary markings;
a secondary scale extending from said tape measure housing, wherein said secondary scale comprises a plurality of uniformly spaced secondary markings, wherein a distance between adjacent secondary markings is less than a distance between adjacent primary markings, wherein said secondary scale is positioned for direct comparison of said primary markings with said secondary markings.

2. The measuring device according to claim 1, a distance between adjacent secondary markings is set to be equal to $9/10^{th}$ of a distance between adjacent primary markings.

3. The measuring device according to claim 1, wherein said secondary scale is coupled to said tape measure by a guide comprising a measuring channel comprising an upper channel and a lower channel.

4. The measuring device according to claim 3, wherein said retractable measuring tape fits slidably within said lower channel and said secondary scale is slidably coupled to said guide.

5. The measuring device according to claim 3, wherein said guide comprises a longitudinally extending slot passing from a side of said guide to said upper channel, further comprising a releasable fastener passing through said slot for slidably coupling and locking said secondary scale in place.

6. The measuring device according to claim 3, wherein said upper channel is wider than said lower channel.

7. The measuring device according to claim 3, wherein said guide and said tape measure are integrally formed.

8. The measuring device according to claim 3, wherein said guide comprises a measuring notch.

9. The measuring device according to claim 8, wherein said measuring notch is on an underside of said guide.

10. The measuring device according to claim 9, wherein said guide comprises a longitudinally extending slot passing from a side of said guide to said upper channel, further comprising a releasable fastener passing through said slot for slidably coupling and locking said secondary scale in place.

11. The measuring device according to claim 10, wherein said guide extends longitudinally from said tape measure, and wherein said primary markings are along a first longitudinal edge of said measuring tape and said secondary markings are along an edge of a guide most proximate said first longitudinal edge.

12. The measuring device according to claim 1, further comprising a guide that extends longitudinally from said tape measure, wherein said primary markings are along a first longitudinal edge of said measuring tape and said secondary marking are along an edge of a guide most proximate said first longitudinal edge.

13. The measuring device according to claim 1, further comprising a lip coupled to a distal end of said measuring tape.

14. A kit comprising:
a measuring device according to claims 1; and
a calibration block.

15. The kit according to claim 14, further comprising directions for calibrating said measuring device using said calibration block.

16. The kit according to claim 14, wherein said secondary scale is coupled to said tape measure by a guide comprising a measuring channel comprising an upper channel and a lower channel, wherein said retractable measuring tape fits slidably within said lower channel and said secondary scale is slidably coupled to said guide.

17. The kit according to claim 16, wherein said guide comprises a longitudinally extending slot passing from a side of said guide to said upper channel, further comprising a releasable fastener passing through said slot for locking said secondary scale in place.

18. The kit according to claim 17, further comprising a lip coupled to a distal end of said measuring tape.

19. The kit according to claim 18, further comprising instructions for calibrating said measuring device using said calibration block, wherein said measuring device further comprises a measuring notch in an underside of said guide.

20. The kit according to claim 19, wherein said instructions comprise:
placing said calibration block so that said lip presses against a first side of said calibration block and an opposite side of said calibration block presses against said notch, and
adjusting a longitudinal position of said secondary scale.

\* \* \* \* \*